United States Patent Office 3,098,860
Patented July 23, 1963

3,098,860
17-ETHER DERIVATIVES OF PREGNANES
Frances G. Hoffman, Newark, N.J., assignor to Merck & Co., Inc., Rahway, N.J., a corporation of New Jersey
No Drawing. Filed Dec. 20, 1961, Ser. No. 161,776
18 Claims. (Cl. 260—397.4)

This invention relates to novel 17-ether derivatives of progesterone. More particularly, it relates to 17-alkoxy-4,6-pregnadiene-3,20-dione compounds, the $\Delta^1$-analogues thereof, and processes for preparing the same. These novel 17-ether steroids have been found to possess highly effective progestational activity.

This application is a continuation-in-part of Serial No. 151,434, filed November 10, 1961.

The novel 17-alkoxy-4,6-pregnadiene-3,20-dione and 17-alkoxy-1,4,6-pregnatriene-3,20-dione compounds, subject of the present invention, may be chemically represented as follows:

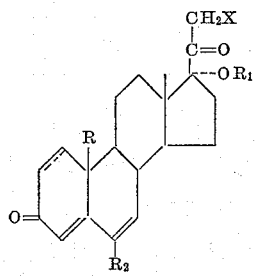

wherein R is hydrogen or methyl, $R_1$ is lower alkyl, $R_2$ is hydrogen, halo, or lower alkyl, and X is hydrogen or halo, and the dotted line in ring A indicates that either a single or double bond may be present.

These novel 17-alkoxy-4,6-pregnadiene-3,20-dione and 17-alkoxy-1,4,6-pregnatriene-3,20-dione compounds may be prepared by reacting a 17-alkoxy-4-pregnene-3,20-dione compound with chloranil to produce the corresponding 17-alkoxy-4,6-pregnadiene compound. This compound is then converted to the corresponding 1,4,6-pregnatriene by contact with either a chemical or microbiological dehydrogenating agent, as for example, selenium dioxide or the microorganism Bacillus sphaericus, respectively.

The 17-alkoxy-4-pregnene-3,20-dione compounds employed as starting materials in accordance with the present process include such compounds as: 17-methoxy-4-pregnene-3,20-dione, 17-ethoxy-4-pregnene-3,20-dione, 17-methoxy-19-nor-4-pregnene-3,20-dione, 17-pentoxy-19-nor-4-pregnene-3,20-dione, 17-methoxy-6-methyl-4-pregnene-3,20-dione, 17-propoxy-6-methyl-4-pregnene-3,20-dione, 17-methoxy-6-chloro-4-pregnene-3,20-dione, 17-ethoxy-6-fluoro-4-pregnene-3,20-dione, 17-methoxy-21-fluoro-4-pregnene-3,20-dione, 17-butoxy-21-fluoro-4-pregnene-3,20-dione, and the like.

In the first step of the above-described process, the 17-alkoxy-4-pregnene starting compound is reacted with chloranil to form the corresponding $\Delta^{4,6}$-compound. This reaction is most conveniently effected by dissolving the steroid material in a suitable solvent, as for example, ethyl acetate, t-butanol, acetone or the like, adding the chloranil and refluxing the solution for a period of from 12–24 hours in a nitrogen atmosphere. The resulting 4,6-pregnadiene compound is conveniently recovered by concentrating the reaction mixture under reduced pressure to yield the crystalline product.

The next step of this process is carried out by reacting the 4,6-pregnadiene compound with a suitable dehydrogenating agent to produce the corresponding 1,4,6-pregnatriene. This reaction is desirably carried out with selenium dioxide, although such microorganisms as Bacillus sphaericus, Nocardia formica, and the like are also satisfactorily employed in $\Delta^1$-dehydrogenating the A-ring of the steroid nucleus.

When selenium dioxide is used, the reaction is conveniently effected by bringing the 4,6-pregnadiene material and the selenium dioxide together in a solvent such as dioxane, and alcohol such as t-butanol or the like and heating the mixture at an elevated temperature. When t-butanol is used as the solvent it is ordinarily preferred to carry out this reaction at the boiling point of the solvent, under which conditions the reaction is ordinarily complete in about fifteen hours. In recovering the resulting 1,4,6-pregnatriene, the reaction mixture is filtered to remove any metallic selenium and the filtered solution evaporated to dryness to give the desired 17-alkoxy-1,4,6-pregnatriene-3,20-dione compound in crystalline form. If desired, this material may be further purified by paper strip chromatography or by chromatography using silica gel.

The following examples illustrate methods of carrying out the present invention but it is to be understood that these examples are given for purposes of illustration and not of limitation.

Example 1

A suspension of 17α-methoxy-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-4,6-pregnadiene-3,20-dione.

In accordance with the foregoing procedure, but starting with 17α-ethoxy-4-pregnene-3,20-dione, there is obtained the corresponding 17α-ethoxy-4,6-pregnadiene-3,20-dione.

The 17α-methoxy-4-pregnene-3,20-dione used as the starting material can be prepared as follows:

A mixture of 100 mg. of 4-pregnene-17α-ol-3,20-dione, 5.0 ml. of methyl iodide and 300 mg. of silver oxide prepared, for example, by precipitation of a warm aqueous solution of silver nitrate with approximately one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether:petroleum ether (3:7) to (1:9) contains the desired 17α-methoxy-4-pregnene-3,20-dione. The product is recovered and purified by evaporation of the solvent from the eluate fraction and recrystallization of the residue.

In accordance with the foreging procedure, but using ethyl iodide in place of methyl iodide, there is obtained the corresponding 17α-ethoxy-4-pregnene-3,20-dione.

Example 2

A suspension of 17α-methoxy-19-nor-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-19-nor-4,6-pregnadiene-3,20-dione.

In accordance with the foregoing procedure, but starting with 17α-propoxy-19-nor-4-pregnene-3,20-dione, there is obtained the corresponding 17α-propoxy-19-nor-4,6-pregnadiene-3,20-dione.

The 17α-methoxy-19-nor-4-pregnene-3,20-dione used as the starting material can be prepared as follows:

A mixture of 100 mg. of 19-nor-4-pregnene-17α-ol-3,20-dione, 5.0 ml. of methyl iodide and 300 mg. of silver oxide prepared, for example, by precipitation of a warm aqueous solution of silver nitrate with approximately one mole of an aqueous solution of pure sodium hydroxide, is stirred at the reflux temperature for approximately 7 hours. The entire reaction mixture is then filtered to remove the precipitated silver iodide, excess silver oxide and occluded impurities. The solid precipitate is then washed on the filter with chloroform to remove any occluded steroid. The filtrate and washings containing the product are combined and evaporated under reduced pressure to give a solid residue comprising the product. The residue is dissolved in benzene and chromatographed on 5 g. of acid-washed alumina. The eluate from the chromatograph column having a solvent composition of ether:petroleum ether (3:7) to (1:9) contains the desired 17α-methoxy-19-nor-4-pregnene-3,20-dione. The product is recovered and purified by evaporation of the solvent from the eluate fraction and recrystallization of the residue.

In accordance with the foregoing procedure, but substituting propyl iodide for methyl iodide there is obtained the corresponding 17α-propoxy-19-nor-4-pregnene-3,20-dione.

*Example 3*

A suspension of 17α-methoxy-6α-methyl-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-6-methyl-4,6-pregnadiene-3,20-dione.

In accordance with the foregoing procedure, but starting with 17α-ethoxy-6α-methyl-4-pregnene-3,20-dione there is obtained the corresponding 17α-ethoxy-6-methyl-4,6-pregnadiene-3,20-dione.

The 17α-methoxy-6α-methyl-4-pregnene-3,20-dione used as the starting material can be prepared as follows:

To 5 g. of 17α-hydroxy-4-pregnene-3,20-dione in 200 ml. of benzene is added 5 ml. of ethylene glycol and 100 mg. of p-toluenesulfonic acid. This mixture is refluxed under a water separator for 24 hours. An additional 5 ml. of ethylene glycol and 100 mg. of p-toluenesulfonic acid is then added and the refluxing continued for 24 hours more. The benzene is cooled and ether added. The combined solvents containing 3,20-bis-ethylenedioxy-5-pregnene-17α-ol are washed with aqueous sodium bicarbonate, dried and concentrated in vacuo to an oil. When this oil is triturated with ether, crystalline product melting at 190° C. is obtained.

2.4 grams of 3,20-bis-ethylenedioxy-5-pregnene-17α-ol is dissolved in 35 ml. of 0.3 molar perbenzoic acid in benzene. After standing two days at room temperature, the solution is cooled to 10° C. and a 15% solution of sodium bisulfite is added until a negative potassium iodide test is obtained. The benzene solution is then washed with sodium bicarbonate, dried and concentrated in vacuo to 2 g. of mixed oxides. The mixed oxides are dissolved in benzene and chromatographed on acid-washed alumina. Elution of the column with a mixture of ether-chloroform (1:1) yielded 603 mg. of the 5,6α-oxido-3,20-bis-ethylenedioxy-pregnane-17α-ol. Melting point 208–213° C.

$\lambda_{max}^{Nujol}$ 2.7μ, 9.1

To a solution of 400 mg. of 5,6α-oxido-3,20-bis-ethylenedioxy-pregnane-17α-ol in 96 ml. of dry benzene under nitrogen is added 3.76 ml. of 3-molar methyl magnesium bromide in ether. The mixture is heated at 70° C. under nitrogen for 4 hours. After cooling to 5° C., 9 g. of ammonium chloride in 90 ml. of water is added over a 20-minute period. The benzene is separated and the aqueous layer extracted with benzene. The combined benzene is washed neutral with water, dried and evaporated to dryness in vacuo to yield 346 mg. of oil comprising 3,20-bis-ethylenedioxy-6β-methyl-pregnane-5α,17α-diol, which, upon trituration with ether, forms crystals of product, M.P. 174–177° C.

A solution of 346 mg. of 3,20-bis-ethylenedioxy-6β-methyl-pregnane-5α,17α-diol is dissolved in 18 ml. of methanol and purged with nitrogen. 1.92 ml. of 8% sulfuric acid (v./v.) is added and then heated at reflux under nitrogen for 35 minutes. The reaction mixture is then cooled to 5° C. and a solution of 1.92 g. of sodium bicarbonate in 40 ml. of water is added with stirring. The gummy precipitate is extracted with chloroform and methylene chloride and the organic extract washed with water, dried and concentrated in vacuo to yield 311 mg. of crystalline 5α,17α-dihydroxy-6β-methyl-pregnane-3,20-dione. Melting point 250–258° C.

$\lambda_{max.}^{Nujol}$ 275–282° C., 5.85, 5.95, 9.1μ

To a solution of 311 mg. of 5α,17α-dihydroxy-6β-methyl-pregnane-3,20-dione in 15 ml. of methanol is added in a nitrogen atmosphere 0.47 ml. of 5% potassium hydroxide. The reaction mixture is refluxed under nitrogen for one hour. It is then cooled to 5° C. and acidified with a few drops of glacial acetic acid. Ten ml. of water is added and the methanol is removed by concentration in vacuo. The reaction mixture is then extracted with methylene chloride, washed with water, dried and evaporated to give 17α-hydroxy-6α-methyl-4-pregnene-3,20-dione.

A mixture is prepared of 150 mg. of 17α-hydroxy-6α-methyl-4-pregnene-3,20-dione, 3 ml. of N,N'-dimethylformamide and 1.5 ml. methyl iodide and to this is added 300 mg. of silver oxide prepared according to the procedure described in Example 1. The mixture is stirred at room temperature for approximately 16 hours. About 25 ml. of chloroform is added and the inorganic precipitate is filtered off and washed with chloroform. The filtrate and washings containing the product are combined and evaporated under reduced pressure to give a residue of crude crystalline product. The product is then purified by chromatography on 6 g. of acid-washed alumina. The eluate having a solvent composition of ether:petroleum ether (3:2) contains the major portion of the product. After evaporation of the solvent from the eluate, the product is further purified by recrystallization from methanol to give 17α-methoxy-6α-methyl-4-pregnene-3,20-dione having a melting point of 172–174° C.

In accordance with the foregoing procedure, but substituting ethyl iodide for methyl iodide in the alkylation of 6α-methyl-17α-hydroxy-4-pregnene-3,20-dione, there is obtained the corresponding 17α-ethoxy-6α-methyl-4-pregnene-3,20-dione.

*Example 4*

A suspension of 17α-methoxy-6α-chloro-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-6-chloro-4,6-pregnadiene-3,20-dione.

In accordance with the foregoing procedure, but starting with 17α-methoxy-6α-fluoro-4-pregnene-3,20-dione there is obtained the corresponding 17α-methoxy-6-fluoro-4,6-pregnadiene-3,20-dione.

The 17α-methoxy-6α-chloro-4-pregnene-3,20-dione used as the starting material can be prepared as follows:

A solution of 900 mg. of 17α-methoxy-4-pregnene-3,20-dione (prepared as described in Example 1) in 2 ml. of pyridine and 1 ml. of benzoyl chloride is warmed at 50 C. for 3 hours, then cooled, poured into 5% aqueous sodium bicarbonate and extracted with chloroform. The extracts are washed successively with water, 5% hydrochloric acid, water, 5% sodium bicarbonate, water, then dried over anhydrous sodium sulfate and concentrated to an oily residue. The crude product is absorbed on 60 g. of acid-washed alumina and subsequently eluted with ethyl ether to afford the crystalline enol benzoate.

A suspension of 100 mg. of the 3-enol benzoate of 17α-methoxy-4-pregnene-3,20-dione in 2.4 ml. of glacial acetic acid, 0.8 ml. of acetic anhydride, and 0.8 ml. of 5% dry hydrogen chloride in acetic anhydride is cooled to about 15° C. and 32 mg. of N-chlorosuccinimide is added. The resulting solution is stored at 5° C. for 2½ hours, then distributed between chloroform and 5% aqueous sodium bicarbonate. The chloroform layer is separated and washed with successive portions of water, 5% sodium bicarbonate, water, then dried over magnesium sulfate and concentrated to a colorless oil which crystallizes after trituration with ether to afford 17α-methoxy-6α-chloro-4-pregnene-3,20-dione.

*Example 5*

A suspension of 17α-methoxy-21-fluoro-4-pregnene-3,20-dione (100 mg.) and chloranil (200 ml.) in 2.3 ml. of ethyl acetate and 0.5 ml. of acetic acid is heated under reflux overnight, protected by a blanket of nitrogen. The solvent is removed and the residue of the solvent is dissolved in chloroform. The resulting solution is washed successively with 10% aqueous sodium bisulfite solution, 5% potassium hydroxide, and then water. The solution is dried over sodium sulfate and concentrated under reduced pressure to give 17α-methoxy-21-fluoro-4,6-pregnadiene-3,20-dione.

In accordance with the foregoing procedure, but starting with 17α-butoxy-21-fluoro-4-pregnene-3,20-dione there is obtained the corresponding 17α-butoxy-4,6-pregnadiene-3,20-dione.

The 17α-methoxy-21-fluoro-4-pregnene-3,20-dione used as the starting material can be prepared as follows:

The 21-fluoro-17α-hydroxy-4-pregnene-3,20-dione is prepared by first reacting the known 17α,21-dihydroxy-4-pregnene-3,20-dione with methanesulfonyl-chloride to produce 21-methanesulfonyloxy-17α-hydroxy-4-pregnene-3,20-dione and then heating the formed 21-methanesulfonate with potassium fluoride in dimethylformamide to produce 21-fluoro-17α-hydroxy-4-pregnene-3,20-dione.

A mixture is prepared of 100 mg. of 21-fluoro-17α-hydroxy-4-pregnene-3,20-dione, 5 ml. of methyl iodide and 300 mg. of silver oxide prepared according to the procedure described in Example 1. The mixture is stirred at the reflux temperature for approximately 72 hours. The inorganic precipitate containing silver iodide which formed during the course of the reaction is filtered off and washed with chloroform to recover any occluded product. The filtrate and washings are combined and evaporated under reduced pressure to give a crude residue of product comprising 21-fluoro-17α-methoxy-4-pregnene-3,20-dione. The crude residue of product is dissolved in benzene, chromatographed on acid-washed alumina and recrystallized from a mixture of methylene chloride and ether to give essentially pure 21-fluoro-17α-methoxy-4-pregnene-3,20-dione.

In similar manner and using N-butyl iodide as the halogenated hydrocarbon reactant, the product obtained after chromatography and crystallization is 21-fluoro-17α-butoxy-4-pregnene-3,20-dione.

In accordance with the foregoing procedure, but substituting butyl iodide for methyl iodide in the alkylation of 17α-hydroxy-21-fluoro-4-pregnene-3,20-dione, there is obtained the corresponding 17α-butoxy-21-fluoro-4-pregnene-3,20-dione.

*Example 6*

To 100 mg. of 17α-methoxy-4,6-pregnadiene-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from the mixture of acetone and ether gives 17α-methoxy-1,4,6-pregnatriene-3,20-dione.

In accordance with the foregoing procedure, but starting with 17α-ethoxy-4,6-pregnadiene-3,20-dione, 17α-methoxy-19-nor-4,6-pregnadiene-3,20-dione, 17α-propoxy-19-nor-4,6-pregnadiene-3,20-dione, 17α-methoxy-6-methyl-4,6-pregnadiene-3,20-dione, or 17α-ethoxy-6-methyl-4,6-pregnadiene-3,20-dione, there is obtained the corresponding 17α-ethoxy-1,4,6-pregnatriene-3,20-dione, 17α-methoxy-19 - nor - 1,4,6-pregnatriene-3,20-dione, 17α-propoxy-19-nor-1,4,6-pregnatriene-3,20-dione, 17α-methoxy-6-methyl-1,4,6-pregnatriene-3,20-dione, or 17α-ethoxy-6-methyl-1,4,6-pregnatriene-3,20-dione, respectively.

*Example 7*

To 100 mg. of 17α-methoxy-6-chloro-4,6-pregnadiene-3,20-dione in 5 ml. of t-butanol and 0.1 ml. of acetic acid is added 50 mg. of selenium dioxide. The mixture is refluxed under nitrogen for 18 hours; then 50 mg. of selenium dioxide is added and the mixture is refluxed for an additional 24 hours. The mixture is filtered, and the filtrate evaporated to dryness. The residue is extracted with ethyl acetate and the extract is washed successively with aqueous sodium bicarbonate, ammonium sulfide, dilute ammonia water, water, dilute hydrochloric acid and water, and then dried over magnesium sulfate. The extract is treated with activated charcoal and then concentrated to dryness. Crystallization of the residue from a mixture of acetone and ether gives 17α-methoxy-6-chloro-1,4,6-pregnatriene-3,20-dione.

In accordance with the foregoing procedure, but starting with 17α-methoxy-6-fluoro-4,6-pregnadiene-3,20-dione, 17α-methoxy-21-fluoro-4,6-pregnadiene-3,20-dione, or 17α-butoxy-21-fluoro-4,6-pregnadiene-3,20-dione there is obtained the corresponding 17α-methoxy-6-fluoro-1,4,6-pregnatriene-3,20-dione, 17α-methoxy - 21 - fluoro-1,4,6-pregnatriene-3,20-dione or 17α-butoxy-21-fluoro-1,4,6-pregnatriene-3,20-dione, respectively.

In addition to possessing superior progestational activity, the Δ⁶-17-alkoxy-progesterone compounds, subject of the present invention, may also be employed as intermediates in the preparation of related steroid compounds possessing valuable aldosterone antagonist activity.

The conversion of the subject Δ⁶-17-alkoxy-progesterone compounds to these aldosterone antagonists is readily carried out by reacting the steroid with a thioalkanoic acid, as for example, thioacetic acid, whereby there is produced the corresponding 7α-acylthio-17-alkoxy-4-pregnene-compound. Thus, for example, a solution of 80 mg.

of 17α-methoxy-21-fluoro-4,6-pregnadiene-3,20-dione in 1.0 ml. of thioacetic acid is heated under reflux on a steam bath for a period of ½ hour. Excess thioacetic acid is evaporated in a stream of nitrogen. Trituration with ether affords crystals which, after two recrystallizations from a mixture of acetone and hexane, gives 7α-acetylthio-17α-methoxy-21-fluoro-4-pregnene-3,20-dione.

Various changes and modifications may be made in carrying out the present invention without departing from the spirit and scope thereof. Insofar as these changes and modifications are within the purview of the annexed claims, they are to be considered as part of our invention.

We claim:
1. 17α - lower alkoxy 21-halo-4,6-pregnadiene-3,20-dione.
2. 17α-methoxy-21-fluoro-4,6-pregnadiene-3,20-dione.
3. 17α-butoxy-21-fluoro-4,6-pregnadiene-3,20-dione.
4. 17α-lower alkoxy-1,4,6-pregnatriene-3,20-dione.
5. 17α-methoxy-1,4,6-pregnatriene-3,20-dione.
6. 17α-ethoxy-1,4,6-pregnatriene-3,20-dione.
7. 17α-lower alkoxy-19-nor-1,4,6-pregnatriene-3,20-dione.
8. 17α-methoxy-19-nor-1,4,6-pregnatriene-3,20-dione.
9. 17α-propoxy-19-nor-1,4,6-pregnatriene-3,20-dione.
10. 17α-lower alkoxy-6-lower alkyl-1,4,6-pregnatriene-3,20-dione.
11. 17α - methoxy-6-methyl-1,4,6-pregnatriene-3,20-dione.
12. 17α-ethoxy-6-methyl-1,4,6-pregnatriene-3,20-dione.
13. 17α-lower alkoxy-6-halo-1,4,6-pregnatriene-3,20-dione.
14. 17α-methoxy - 6 - chloro-1,4,6-pregnatriene-3,20-dione.
15. 17α-methoxy-6-fluoro-1,4,6-pregnatriene-3,20-dione.
16. 17α-lower alkoxy-21-halo-1,4,6-pregnatriene-3,20-dione.
17. 17α - methoxy-21-fluoro-1,4,6-pregnatriene-3,20-dione.
18. 17α-butoxy-21-fluoro-1,4,6-pregnatriene-3,20-dione.

References Cited in the file of this patent

Meystre et al.: Helv. Chim. Acta, vol. 39, part 3, 734–742 (1956).
Bowers et al.: J.A.C.S. 82, 4007–4012 (1959).
Agnello et al.: J.A.C.S. 82, 4293–4299 (1959).